United States Patent
Wang et al.

(10) Patent No.: US 6,925,239 B2
(45) Date of Patent: Aug. 2, 2005

(54) HIGH PERFORMANCE DISPERSION COMPENSATING OPTICAL FIBERS AND MANUFACTURING METHOD FOR THE SAME

(75) Inventors: Tiejun Wang, Wuhan (CN); Yuqing Cao, Wuhan (CN); Jie Luo, Wuhan (CN)

(73) Assignee: Yangtze Optical Fibre and Cable Co., Ltd., Shanghai (CN)

( * ) Notice: Subject to any disclaimer, the term of this patent is extended or adjusted under 35 U.S.C. 154(b) by 0 days.

(21) Appl. No.: 10/928,710

(22) Filed: Aug. 27, 2004

(65) Prior Publication Data

US 2005/0100295 A1    May 12, 2005

(51) Int. Cl.[7] .................................................. G02B 6/02
(52) U.S. Cl. ........................ 385/127; 385/123; 385/126
(58) Field of Search ........................ 385/122–128, 385/131, 100, 96.15, 96.33

(56) References Cited

U.S. PATENT DOCUMENTS

| | | | |
|---|---|---|---|
| 5,361,319 A | | 11/1994 | Antos et al. |
| 5,740,297 A | | 4/1998 | Onishi et al. |
| 6,317,549 B1 | * | 11/2001 | Brown ........................ 385/127 |
| 6,603,913 B1 | * | 8/2003 | Okuno ........................ 385/127 |
| 6,668,121 B2 | * | 12/2003 | Sugizaki et al. ............. 385/127 |
| 6,813,430 B2 | * | 11/2004 | Aikawa et al. ............. 385/127 |
| 6,856,744 B2 | * | 2/2005 | Kumano ...................... 385/127 |
| 2002/0159731 A1 | | 10/2002 | Gruner-Nielson et al. |
| 2003/0095768 A1 | * | 5/2003 | Mukasa ...................... 385/127 |
| 2003/0133678 A1 | * | 7/2003 | Mukasa ...................... 385/127 |
| 2004/0052486 A1 | * | 3/2004 | Gaarde et al. .............. 385/127 |
| 2004/0146261 A1 | * | 7/2004 | Zhang et al. ............... 385/127 |
| 2004/0218881 A1 | * | 11/2004 | Rathje et al. ............... 385/123 |
| 2004/0234219 A1 | * | 11/2004 | Aikawa et al. ............. 385/127 |

FOREIGN PATENT DOCUMENTS

| | | | |
|---|---|---|---|
| CN | 1087432 C | 7/2002 | |
| CN | 1100273 C | 1/2003 | |
| JP | 2003-241001 | * 8/2003 | ............ G02B 6/22 |
| WO | WO 98/04941 | 2/1998 | |

* cited by examiner

*Primary Examiner*—Frank G. Font
*Assistant Examiner*—James P. Hughes
(74) *Attorney, Agent, or Firm*—Dorsey & Whitney LLP

(57) ABSTRACT

A high performance dispersion compensating optical fiber is provided. In one embodiment, the optical fiber includes a core layer and a cladding layer surrounding the core layer. The core layer includes five core sublayers wherein the □% of the first core sublayer is positive, and the □% of at least one of the other core sublayers is negative, the radius ranges of the respective core sublayers beginning outwardly from the first core sublayer are 0.6 to 0.8 μm, 1.0 to 1.2 μm, 1.6 to 2.0 μm, 5.0 to 6.0 μm, and 7.0 to 8.0 μm, respectively; the ranges of □% of the respective sublayers beginning outwardly from the first core sublayer are about 1.8 to 2.1%, 1.2 to 1.4%, 0.6 to 1%, −0.4 to −0.6% and 0.2 to 0.4%, and the cladding layer is a pure Silicon Dioxide glass layer.

7 Claims, 2 Drawing Sheets

HIGH PERFORMANCE DISPERSION COMPENSATING OPTICAL FIBERS AND MANUFACTURING METHOD FOR THE SAME

TECHNICAL FIELD

The present invention relates to a dispersion compensating optical fiber and a dispersion compensating module as well as a method for manufacturing the dispersion compensating optical fiber, more specifically, it relates to a method for manufacturing an optical fiber preform by using a plasma chemical vapor deposition method, controlling the refractive index profile and the doped material of the optical fiber to prepare a high performance dispersion optical fiber. The said optical fiber has a low attenuation characteristic and a high Figure of Merit.

BACKGROUND ART

The distortion of the signal wave caused by the dispersion of a transmission optical fiber is a constraint factor of the long distance transmission. It is shown by a theoretical analysis that the higher the rate of the transmission system, the smaller the dispersion being permitted. In order to decrease the influence of the dispersion, an effective method currently used to solve the effect of the dispersion of the optical fiber to the system performance is to employ a dispersion compensating technology, that is, the dispersion compensating optical fiber is used to compensate the dispersion. Meanwhile, it is required that the dispersion compensating optical fiber has a dispersion profile which is an inversion of that of the communication optical fiber, that is, a negative dispersion slope.

For a dispersion compensating module on a transmission link, since it realization of the function of dispersion compensation compromise with the introduction of an insertion loss. The transmission performance of an optical communication system will be improved in several aspects by decreasing the insertion loss of the dispersion compensating module: decreasing the signal to noise ratio of the transmission system; simplifying the design of the optical amplifier module; decreasing the input power; and lowering the influence of the non-linear effect to transmission. Therefore, it is of great importance to decrease the insertion loss of the dispersion compensating module for the optimization of transmission performance, decrease in communication cost and simplification of system design. The insertion loss of the dispersion compensating module comprises both of the attenuation and the splice loss of the dispersion compensating optical fiber. In the case that the splice loss is determined, the insertion loss of the module depends on the attenuation of the optical fiber. The attenuation of the optical fiber $A_{fiber}$ is:

$$A_{fiber}=A_{tt} \times L=A_{tt} \times D_{total}/D=D_{total}/FOM$$

wherein, $A_{tt}$ is the attenuation coefficient of the optical fiber, L is the length of the optical fiber, $D_{total}$ is the total dispersion of the module, D is the dispersion coefficient of the optical fiber, FOM is the Figure of Merit of the optical fiber, and:

$$FOM=D/A_{tt}$$

Therefore, the dispersion compensating optical fiber used for the dispersion compensating module should have not only a low attenuation coefficient but also a high Figure of Merit. At present, the Figure of Merit can reach a level of 200 ps/nm.dB, and the individual ones can reach 300 ps/nm.dB.

In the related patents, U.S. Pat. No. 5,361,319 has disclosed a general reflection index profile for a dispersion compensating optical fiber, however, the specifications of the attenuation (less than 1 dB/km) and the dispersion (less than −20 ps/nm.km) of which cannot satisfy the present communication transmission application, and its Figure of Merit is only 120 ps/nm.dB. In U.S. Pat. No. 2,002,0159731 A1, the Figure of Merit can reach 300 ps/nm.dB by using a method for optimizing the optical fiber reflection index profile and using a phosphorus doping material in an improved preform manufacturing process by chemical vapor deposition technology. However, this is at the cost of: the optical fiber has low negative dispersion (less than −180 ps/nm.km), and the operating wavelength is near the cut-off wavelength, thereby the optical fiber has a sensitive bend loss and operates unstably. The attenuation of the optical fiber also cannot be decreased easily (greater than 0.5 dB/km). Chinese Patent CN 1100273C has disclosed a refractive index profile of a dispersion compensating optical fiber and the properties that it can acquire, however, this patent does not relate to the attenuation and the Figure of Merit, so it can not estimate comprehensively the dispersion compensating optical fiber. Chinese Patent CN 1087432C has disclosed a preform manufacturing technology of a germanium dioxide and fluorine doped dispersion compensating optical fiber, however, the problems of the worse specifications of the attenuation (less than 1 dB/km) and the dispersion (less than −50 ps/nm.km) still exist in the said patent, and an important parameter, Figure of Merit, has not been related to.

Definitions of Some Terms in the Invention

Refractive index profile: the relationship between the glass refractive index of an optical fiber or a preform (including the core rod) of the optical fiber and its radius.

Sleeve tube: a thick wall high purity glass tube which meets the requirement of a certain cross section area.

RIT technology: inserting the core rod into the sleeve tube to form an optical fiber preform.

Oxygen and Silicon ratio (O/Si ratio): It is defined as the ratio of the total oxygen and ($SiCl_4+GeCl_4$) introduced into a substrate tube during deposition.

Relative refractive index: $\Delta\%=[(n_i^2-n_0^2)/2n_i^2]\times 100\%$, wherein $n_i$ is the optical fiber refractive index of the $i_{th}$ layer, $n_0$ is the refractive index of a pure silica glass layer. $n_i$ is the largest refractive index indicated by $\Delta\%$ in the optical fiber core region, unless otherwise stated. The radius of each sublayer is from the central line of the optical fiber to a farthest point from the central line of the said sublayer. The refractive index profile of the sublayer is the refractive index value of the said sublayer at the respective radial points.

Total dispersion is defined as an algebraic sum of the optical fiber waveguide dispersion and the material dispersion, in the optical fiber communication field, the total dispersion is referred to as optical fiber dispersion in unit of ps/nm.km.

Dispersion slope represents the dependence of the dispersion value upon the wavelength, being a slope of a curve depicted by taking the horizontal axis as the wavelength and the vertical axis as the dispersion value in the unit of ps/nm².km. In a wavelength division multiplexing system, if the dispersion slope of the transmission link is large, than the deviation between each wavelengths becomes large, and the entire transmission performance will deteriorate.

Effective area Aeff is:

$$Aeff = 2\pi (\int E^2 r dr)^2 / (\int E^4 r dr)$$

wherein the integrating limit is from 0 to ∞, and E is an electrical field relating to propagation.

PMD is the abbreviation of the polarization mode dispersion of the optical fiber.

MCVD: an improved chemical vapor deposition method
PCVD: a plasma chemical vapor deposition method
OVD: a vapor deposition method outside the tube
VAD: an axial vapor deposition method

DISCLOSURE OF THE INVENTION

Addressing the above deficiencies in the prior art, the technical problems to be solved in the invention is to provide a dispersion compensating optical fiber and a dispersion compensating module as well as a method of manufacturing the dispersion compensating optical fiber. The related dispersion compensating optical fiber and the module are in a single mode transmission form at C band, having negative dispersion and dispersion slope, the compensation rate of the dispersion of the optical fiber transmitted at C band can reach above 80%. It has lower attenuation characteristic and higher Figure of Merit at C band, which advantageously enhances the signal to noise ratio of the transmission system.

The technical scheme of the dispersion compensating optical fiber of the invention is: providing an optical fiber comprising a core layer and a cladding layer surrounding the core layer, the core layer comprising five core sublayers, the Δ% of the first core sublayer is positive, and the Δ% of at least one of the other core sublayers is negative, the radius ranges of the respective core sublayers beginning outwardly from the first core sublayer are 0.6 to 0.8 μm, 1.0 to 1.2 μm, 1.6 to 2.0 μm, 5.0 to 6.0 μm, and 7.0 to 8.0 μm, respectively; the ranges of Δ% (s) of the respective sublayers beginning outwardly from the first core sublayer are about 1.8 to 2.1%, 1.2 to 1.4%, 0.6 to 1%, −0.4 to −0.6 and 0.2 to 0.4%, the cladding layer is a pure Silicon Dioxide glass layer or a freon $C_2F_6$ doped Silicon Oxide cladding layer.

According to the above scheme, a sixth core sublayer can be disposed outside five core sublayers, the radius range of the sixth core sublayer is about 9.0 to 10.0 μm, the range of Δ% of the sixth core sublayer is about −0.2 to −0.4%. The cladding layer is outside the sixth core sublayer.

An optimized optical waveguide structure can obtain better optical characteristics in an improved optical fiber manufacturing process.

The dispersion compensating optical fiber of the invention has a low attenuation, the attenuation at 1545 nm being no greater than 0.4 dB/km, the attenuation in the wavelength range of 1525 nm~1565 nm being no greater than 0.5 dB/km; and more desirably, the attenuation in the wavelength range of 1525 nm~1565 nm being no greater than 0.45 dB/km.

The dispersion compensating optical fiber of the invention has a high Figure of Merit, the Figure of Merit at 1545 nm being greater than 350 ps/nm.dB, more desirably, it can be greater than 400 ps/nm.dB;

The dispersion compensating optical fiber of the invention has a low negative dispersion at C band (1525 nm~1565 nm), the dispersion coefficient being −90~−200 ps/nm.km; more desirably, being −120~−180 ps/nm km;

The dispersion compensating optical fiber of the invention has a negative dispersion slope at C band (1525 nm~1565 nm), the dispersion slope at 1545 nm being −0.4~−1.0 ps/nm km;

The relative dispersion slope of the dispersion compensating optical fiber of the invention is similar to that of a standard single mode optical fiber. At 1545 nm, the relative dispersion slope RDS (the ratio of the dispersion slope and the dispersion) of the standard single mode optical fiber is 0.0037 $nm^{-1}$; the relative dispersion slope of the dispersion compensating optical fiber of the invention is 0.0030 $mm^{-1}$~0.0044 $nm^{-1}$; more desirably, the relative dispersion slope is 0.0034 $mm^{-1}$~0.0040 $nm^{-1}$; thus, the compensation rate for G652 optical fiber can reach 100%±10% at C band.

Because the special design of the fiber core layer, that is, a transition structure of the second, third layer is employed, the polarization mode dispersion will decrease significantly to reach 0.1 $ps/km^{1/2}$.

The effective area of the dispersion compensating optical fiber of the invention is larger than 15 $\mu m^2$ at 1545 nm, more desirably, larger than 18 $\mu m^2$.

In the dispersion compensating module of the invention, the dispersion compensating optical fiber is formed by using the dispersion compensating optical fiber of the invention, it is used for compensating the dispersion in the wavelength division multiplexing communication system.

The technical scheme of a method for manufacturing the dispersion compensating optical fiber of the invention is: depositing on the inner wall of the substrate tube by using PCVD process to deposit a layer, which has a particular structure design; the substrate tube being collapsed to form a solid core rod according to a collapsing process; the core rod and a low hydroxyl sleeve tube being combined into an optical fiber preform by using a RIT process, or producing the optical fiber preform by depositing an outer cladding layer on the outer surface of the core rod; and sending the optical fiber preform into a fiber-drawing furnace for drawing it out to form a fiber. Its differences from a conventional PCVD process for manufacturing optical fiber are: the freon ($C_2F_6$) being doped in the process for depositing the core rod to realize the deposition of the trench sublayer around the optical fiber core, and using a large size optical fiber preform manufacturing technology, in which the diameter of the optical fiber preform reaching 80 mm~160 mm, then the large size preform being drawn out as a preform having a small diameter by using a stretching process, and then sending it into a fiber-drawing furnace for drawing.

Based on the above scheme, the diameter of the optical fiber preform is normally 80 mm~120 mm, the diameter of the small diameter preform after stretching is 60 mm~30 mm, it decreases advantageously the contents of the impurities and the defects in the preform.

In the refractive index structure of the optical fiber, the contribution of the freon doped trench core sublayer to the refractive index is −0.4% to −0.9%.

In the manufacturing method of the invention, freon ($C_2F_6$) can also be doped in a part of the cladding layers to decrease the viscosity of the optical fiber preform, thereby to decrease the tension of fiber-drawing process and to decrease the attenuation of the optical fiber as well as to increase the Figure of Merit.

DETAILED DESCRIPTION OF THE INVENTION

Figure 1:
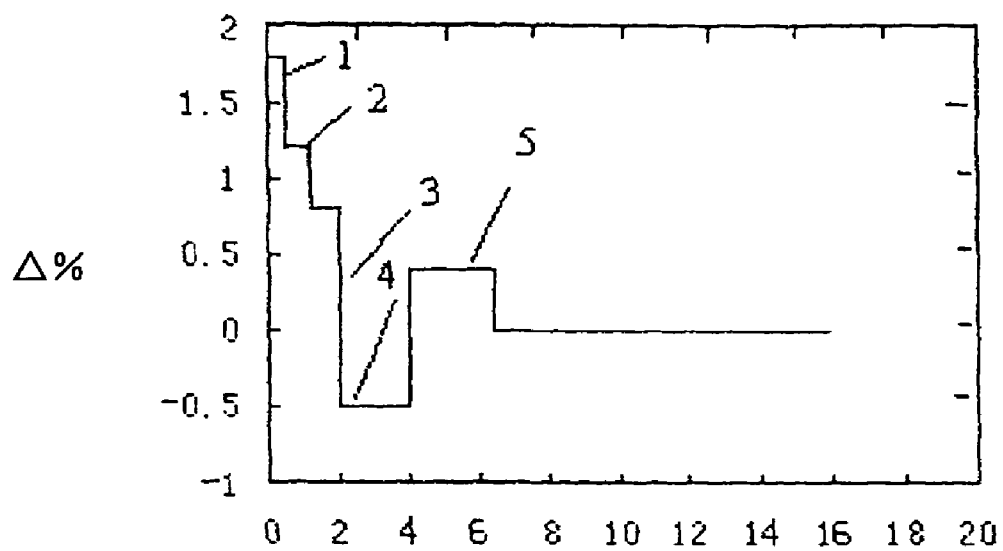
FIG. 1 is a distribution diagram of the refractive index profile structure of the fiber core according to a first embodiment of the invention.
Figure 2:
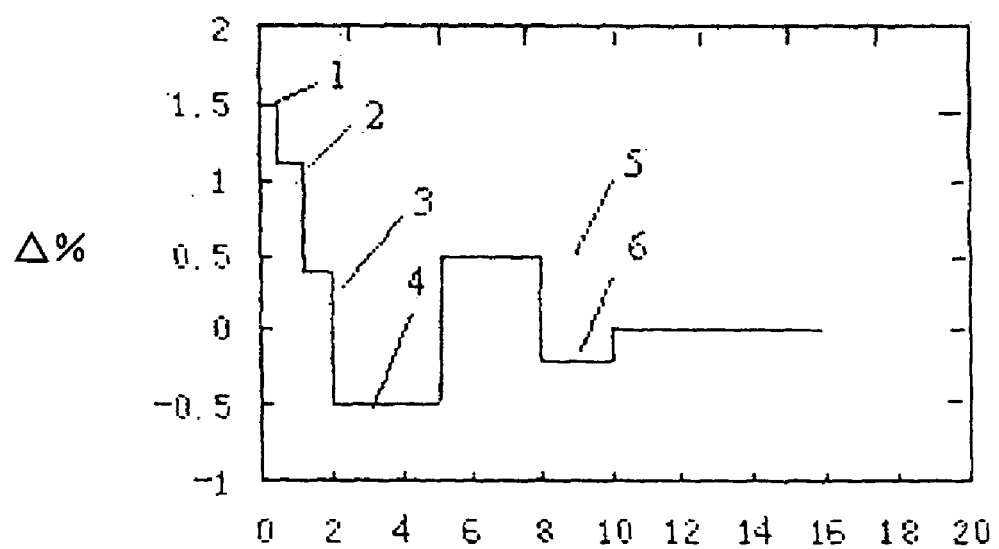
FIG. 2 is a distribution diagram of a refractive index profile structure of the fiber core according to a fourth embodiment of the invention.

The embodiments of the invention will be described in combination with the drawings as follows.

In embodiment 1, the radii of the respective core sublayers beginning outwardly from the first core sublayer are about 0.6 $\mu$m, 1.0 $\mu$m, 1.6 $\mu$m, 5.0 $\mu$m, and 7 $\mu$m, respectively; the $\Delta\%$ (s) of the respective core sublayers beginning outwardly from the first core sublayer are about 1.8%, 1.2%, 0.6%, −0.6% and 0.2%, the cladding layer is a pure Silicon Dioxide glass layer. When manufacturing, a layer is deposited on the inner wall of substrate tube by using PCVD process, which has a certain structure design; the substrate tube is collapsed to form a solid core rod according to a collapsing process; the core rod and a low hydroxyl sleeve is combined by using a RIT process into an optical fiber preform, the diameter of the preform being 80 mm, the diameter of the preform after stretching being 40 mm; and then it is sent into a fiber-drawing furnace for drawing. At 1545 nm, the dispersion of the optical fiber is −160 ps/nm km and the dispersion slope is −0.61 ps/nm km, at 1545 nm, the attenuation is 0.38 dB/km, the Figure of Merit reaches 421 ps/nm.dB, RDS is 0.0038 $nm^{-1}$, and the polarization mode dispersion reaches 0.081 $ps/km^{1/2}$.

In embodiment 2, the radii of the respective core sublayers beginning outwardly from the first sublayer are about 0.7 $\mu$m, 1.1 $\mu$m, 1.8 $\mu$m, 5.5 $\mu$m, and 8 $\mu$m, respectively; the $\Delta\%$ (s) of the respective sublayers beginning outwardly from the first sublayer are about 2.0%, 1.2%, 0.7%, −0.6%, 0.3%. The diameter of the preform is 120 mm, the diameter of the preform after stretching is 30 mm. At 1545 nm, the dispersion is −142 ps/nm km and the dispersion slope is −0.52 ps/nm km, at 1545 nm, the attenuation of the optical fiber is 0.37 dB/km, the Figure of Merit reaches 383 ps/nm.dB, RDS is 0.0037 $nm^{-1}$, and the polarization mode dispersion reaches 0.06 $ps/km^{1/2}$.

In embodiment 3, the radii of the respective core sublayers beginning outwardly from the first sublayer are about 0.8 $\mu$m, 1.2 $\mu$m, 2.0 $\mu$m, 6.0 $\mu$m, 8 $\mu$m, respectively; the $\Delta\%$ (s) of the respective sublayers beginning outwardly from the first sublayer are about 2.1%, 1.4%, 1.0%, −0.4%, 0.4%. The diameter of the preform is 160 mm, the diameter of the preform after stretching is 60 mm. At 1545 nm, the dispersion is −140 ps/nm km and the dispersion slope is −0.55 ps/nm, at 1545 nm, the attenuation of the optical fiber is 0.35 dB/km, the Figure of Merit reaches 400 ps/nm.dB, RDS is 0.0040 $nm^{-1}$, and the polarization mode dispersion reaches 0.095 $ps/km^{1/2}$.

In embodiment 4, the radii of the respective core sublayers beginning outwardly from the first sublayer are about 0.7 $\mu$m, 1.1 $\mu$m, 1.8 $\mu$m, 5.5 $\mu$m, 8 $\mu$m, 9 $\mu$m. respectively; the $\Delta\%$ (s) of the respective sublayers beginning outwardly from the first sublayer are about 2.0%, 1.2%, 0.7%, −0.6%, 0.3%, −0.3%. The diameter of the preform is 120 mm, the diameter of the preform after stretching is 40 mm. At 1545 nm, the dispersion is −151 ps/nm and the dispersion slope is −0.56 ps/nm, at 1545 nm, the attenuation of the optical fiber is 0.38 dB/km, the Figure of Merit reaches 397 ps/nm.dB, RDS is 0.0037 $nm^{-1}$, and the polarization mode dispersion reaches 0.10 $ps/km^{1/2}$.

Figure 3:
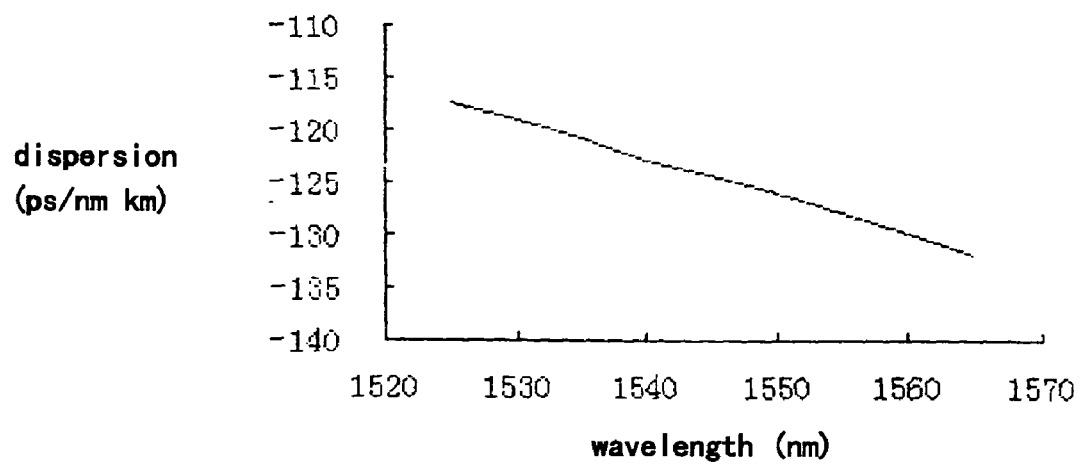
FIG. 3 is a dispersion distribution curve of an optical fiber drawn out according to the invention.

The dispersion curve of the optical fiber drawn out according to the refractive index profile of the invention is shown in FIG. 3. It can be seen that the dispersion is low at a window of 1545 nm, and it has a negative dispersion slope. The dispersion at C band (1525 nm~1565 nm) maintains decreasing.

Figure 4:
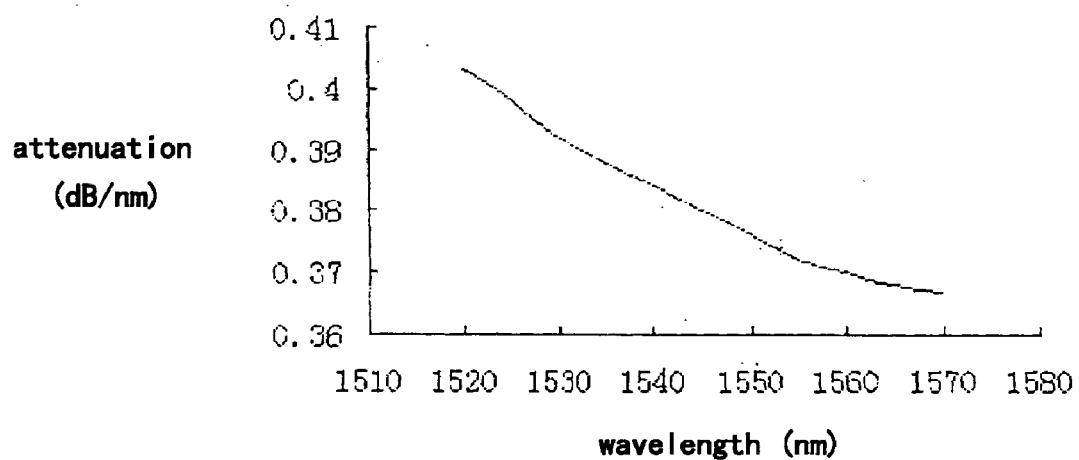
FIG. 4 is an attenuation distribution curve of an optical fiber drawn out according to the invention.

The attenuation curve of the optical fiber drawn out according to the refractive index profile of the invention is shown in FIG. 4. It can be seen that the optical fiber has a low attenuation at C band, the attenuation is not greater than 0.4 dB/km at 1545 nm, and the attenuation is not greater than 0.5 dB/km within the range of 1525 mm~1565 nm.

The beneficial results of the invention are indicated as follows in several aspects:

The dispersion characteristic of the dispersion compensating optical fiber is determined mainly by the waveguide dispersion. Therefore, it is very important that a suitable waveguide structure shall be selected during the design procedure of the compensating optical fiber. The waveguide structure of the optical fiber is determined by the refractive index profile and the corresponding structure parameter of the optical fiber. The design of a dispersion compensating optical fiber shall determine firstly a proper refractive index profile and best structure parameters to allow it to have a large negative dispersion. Furthermore, the characteristics, such as the attenuation, the bend loss, the dispersion slope, the non-linear coefficient, and the like, should be considered comprehensively. For the dispersion compensating optical fiber of the invention, $\Delta\%$ of the first core sublayer is positive, and $\Delta\%$ of at least one other core sublayer is negative. The radii and $\Delta\%$(s) of the respective core sublayers are selected in order to obtain suitable negative dispersion and negative dispersion slope at 1545 nm. Because the dispersion compensating optical fiber has high core refractive index and deeply trench layer, that is, the variation gradient of the refractive index is large, so it will certainly cause large geometry non-circularity and the non-uniformity of the material stress, thereby causing a large polarization mode dispersion. Secondly, the problem of the variation of the refractive index of the core cladding layer being too large has been solved by a design of three-core-sublayer. A buffer region is formed between the highest refractive index of the core sublayer and the lowest refractive index of the core sublayer, that is, the non-uniformity of the material stress is decreased, and it also prevents the deterioration of the refractive index circularity caused by a sharp variation of the refractive index that the manufacturing equipment cannot control precisely from occurring. It causes the corners of the profile curve to be smooth, and the shape of the profile curve center can be a triangle or a parabolic curve, and this variation does not change substantially the performance of the optical fiber.

The dispersion compensating module that the invention relates to is formed by the dispersion compensating optical fiber of the invention, and is sealed in a case of 240 mm×240 mm×40 mm. The said module can compensate the accumulated dispersion of a system operating at C band in an optical communication link, and compensate simultaneously the dispersion slope of C band, the compensation rate can reach 100%±20%, and a better compensation rate can reach 100%±10%.

PCVD process is one of the four processes for manufacturing an optical fiber preform. The method for manufacturing an optical fiber by a typical PCVD process is as follows. A substrate tube is disposed along the axis of the cylinder of a resonant cavity, and a mixture of raw material vapors, including, for example, $O_2$, $SiCl_4$, and $GeCl_4$, and the like, is introduced into the tube; and a local plasma is produced simultaneously in the resonant cavity to cause a reaction between Si, Ge, and O, and the like, thereby a mainly Ge doped SiOx is deposited and formed on the inner surface of the substrate tube. The resonant cavity moves back and forth along the axis of the cylinder of the substrate tube to coat evenly over the entire length. When the deposition is finished, the substrate tube is contracted bying heating into a solid core rod. The core rod has high Ge doped Silicon Oxide layer and not doped or freon ($C_2F_6$) doped Silicon Oxide cladding layer portion surrounded. An optical fiber preform is produced from such core rod by adding a sleeve outside or by depositing an outer cladding layer using OVD deposition method, and the optical fiber preform can be drawn into optical fiber to be used as transmission medium for communication. In PCVD process, it is easy to realize and to control many sublayers. The profile of these multiple fiber cores can improve the stress difference transition between the material with high refractive index and the material with low refractive index, and improve the uniformity of the material stress at the axial direction, and decrease the polarization mode dispersion.

In the manufacturing method according to the invention, the trench sublayer is obtained effectively by doping with freon. Because the high volatility of the freon, among the current four methods for manufacturing the optical fiber preform, only PCVD method can dope effectively with freon. Comparing with the other fluorine containing materials, freon can be deposited more easily by PCVD, and can obtain greater relative refractive index difference, the relative refractive index difference can reach −1.0%, even −1.3%.

In the invention, doping with freon will also allow the viscosity of the materials of different core layers and cladding layers to be matched more properly, the material stress to be lowered to decrease the Rayleigh scattering of the optical fiber, and also the eigen attenuation to be decreased effectively. The profile of the material stress is optimized by doping with freon and the polarization mode dispersion is decreased.

In a manufacturing method of the invention, the technology of using large diameter optical fiber preform is used to decrease the attenuation of the optical fiber. The principle of which can be described in the following aspects. Firstly, the manufacture of large diameter optical fiber preform increases the uniformity of the geometry and optical parameters of the preform in the axial and radial direction. Comparing with a normal G652 optical fiber, the core diameter of the dispersion compensating optical fiber is small, normally less than 4 μm, and the relative refractive index is high, normally greater than 1%, it is not easy to make the core diameter and the refractive index distribute uniformly and stably along the axial direction in the optical fiber, and it is difficult to ensure the circularity of the optical fiber core and the concentricity of the core layer and the cladding layer. This will cause the dispersion characteristic of the optical fiber to be unstable, and the optical fiber attenuation caused by scattering from the interface and the slight bend will be increased. Meanwhile, this will affect the stability of the cut-off wavelength of the optical fiber, wherein the circularity of the core also determines directly the PMD level of the optical fiber. The above problems can be solved excellently by manufacturing large diameter optical fiber preforms. As mentioned, for the dispersion compensating optical fiber of the invention, the core diameter corresponding to an optical fiber preform of 40 mm is only about 1 mm, while the core diameter corresponding to an optical fiber preform of 120 mm is about 3 mm, and the core diameter corresponding to an optical fiber preform of 160 mm is about 4 mm. For deposition inside the tube in PCVD process, the manufacture of the optical fiber preform with large core diameter is highly reproducible, the parameters of the core diameter and the refractive index of the preform in the axial direction and the radial direction will be more stable. Incorporating with the use of a fiber-drawing machine of high precision and high stability, the evenness of the geometrical dimensions of the optical fiber can be ensured. Particularly, the circularity of the core and the concentricity of the core layer and the cladding layer can be improved, and the scattering attenuation caused by an imperfect structure of the optical fiber waveguide can be decreased.

Next, besides the reasons mentioned above, a further reason for the attenuation of the optical fiber being decreased effectively by large diameter optical fiber preform is the function of reducing the scattering of the optical fiber material. In the deposition process of the optical fiber preform, the concentration of the particles of the material, such as SiO, GeO, and the like, produced by chemical reactions, are not uniform inevitably, and, consequently, the refractive index is not uniform, thereby causing an eigen loss of the optical fiber—Rayleigh scattering loss. Regardless of the concentration or the geometrical dimension, in the preform of different diameter, the distribution level of the non-uniformity of this material is the same, it is only related to the technology of the PCDV in-tube deposition process. After a large diameter optical fiber preform is drawn into an optical fiber, the distribution of the defects of non-uniformity in the optical fiber of unit length will be decreased significantly, and thereby the attenuation caused by Rayleigh scattering will be decreased significantly.

On the other hand, large optical fiber preform may "dilute" effectively the impurity ions in the optical fiber material so as to decrease the material adsorption attenuation of the optical fiber. Given the purity of the raw material, the amount of impurities introduced externally depends on the size of individual interfaces of the substrate tube (between the inner surface of the substrate tube and the layer deposited, between the layer deposited and the atmosphere, and the like), while the relationship between it and the process duration is not evident. In PCVD process, the same substrate tube is used to manufacture the core rod of a larger diameter, therefore, it has an approximately same adsorption amount of the impurities. For the impurity source, i.e., the core rod, which has an approximately same adsorption amount of the impurities, the optical fiber preform of larger diameter is produced by using the tube having a large cross section area, the content of the impurities therein in unit volume is less than the content of the impurities in unit volume of a small diameter optical fiber preform produced by the tube having small cross section area, and a greater cladding layer space can be provided for the dilution and diffusion of the impurity ions. The impurity ions causing the adsorption attenuation are mainly the copper ($Cu^{2+}$), iron ($Fe^{2+}$), chromiun ($Cr^{3+}$), cobalt ($Co^{2+}$), manganese ($Mn^{2+}$), nickel ($Ni^{2+}$), vanadium (V), etc. and hydroxyl ions ($OH^-$).

In the manufacturing method of the invention, the drawing technology acting in concert with the manufacture of a large diameter optical fiber preform can further decrease the attenuation of the optical fiber. During the drawing procedure, the particles of the doped materials are redistributed through diffusion under a high temperature (about 1600° C.), causing the concentration of particles to be uniform, and thus the Rayleigh scattering loss to be decreased; high temperature facilitates the elimination of the defects such as the nicks and bubbles in the preform, thereby the scattering attenuation introduced by which can be decreased. On the other hand, the stretching action also causes the volume of local particles to be reduced, thereby the Rayleigh scattering loss is further decreased.

The diameter of the large diameter preform manufactured based on this principle is 80 mm~120 mm, even reaches 160 mm. It is stretched into a preform having smaller diameter, which is less than 60 mm, and the smallest one reaches 30 mm. Then it is drawn into optical fiber directly. The eigen attenuation of the optical fiber can be decreased by controlling the parameters of the core rod through the optimization of PCVD process, and simultaneously, the manufacturing efficiency of the optical fiber is improved and the manufacturing cost is reduced.

What is claimed is:

1. A high performance dispersion compensating optical fiber, comprising a core layer and a cladding layer surrounding the core layer, the core layer comprising five core sublayers, characterized in that the $\Delta\%$ of the first core sublayer is positive, and the $\Delta\%$ of at least one of the other core sublayers is negative, the radius ranges of the respective core sublayers beginning outwardly from the first core sublayer are 0.6 to 0.8 $\mu$m, 1.0 to 1.2 $\mu$m, 1.6 to 2.0 $\mu$m, 5.0 to 6.0 $\mu$m, and 7.0 to 8.0 $\mu$m, respectively; the ranges of $\Delta\%$ of the respective sublayers beginning outwardly from the first core sublayer are about 1.8 to 2.1%, 1.2 to 1.4%, 0.6 to 1%, −0.4 to −0.6% and 0.2 to 0.4%, and the cladding layer is a pure Silicon Dioxide glass layer.

2. A high performance dispersion compensating optical fiber as cited in claim 1, characterized in that a sixth core sublayer is disposed outside said five core sublayers, the radius range of the sixth core sublayer is about 9.0 to 10.0 $\mu$m, the range of $\Delta\%$ of the sixth core sublayer is about −0.2 to −0.4%.

3. A high performance dispersion compensating optical fiber as cited in claim 1, characterized in that the attenuation at 1545 nm is not greater than 0.4 dB/km, the attenuation in the wavelength range of 1525 nm~1565 nm is not greater than 0.5 dB/km; the Figure of Merit at 1545 nm is greater than 350 ps/nm.dB, and the dispersion coefficient at C band (1525 nm~1565 nm) is −90~−200 ps/nm.km.

4. A high performance dispersion compensating optical fiber as cited in claim 1, characterized in that it has a negative dispersion slope at C band (1525 mm~1565 nm), the dispersion slope being −0.4~−1.0 ps/nm² km at 1545 nm.

5. A high performance dispersion compensating optical fiber as cited in claim 1, characterized in that the relative dispersion slope is 0.0030 nm$^{-1}$~0.0044 nm$^{-1}$.

6. A high performance dispersion compensating optical fiber as cited in claim 1, characterized in that the polarization mode dispersion reaches 0.1 ps/km$^{1/2}$.

7. A high performance dispersion compensating module, characterized in that the dispersion compensating optical fiber in the dispersion compensating module is formed by the dispersion compensating optical fiber described in claim 1.

* * * * *

UNITED STATES PATENT AND TRADEMARK OFFICE
CERTIFICATE OF CORRECTION

PATENT NO.        : 6,925,239 B2
APPLICATION NO.   : 10/928710
DATED             : August 2, 2005
INVENTOR(S)       : Tiejun Wang It is certified that error appears in the above-identified patent and that said Letters Patent is hereby corrected as shown below:

On the Title Page #65 after "Prior Publication Data" please insert the following:

--Foreign Application Priority Data

Oct. 28, 2003 (CN)     03125339.3--

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,925,239 B2 | Page 1 of 1 |
| APPLICATION NO. | : 10/928710 | |
| DATED | : August 2, 2005 | |
| INVENTOR(S) | : Tiejun Wang | |

It is certified that error appears in the above-identified patent and that said Letters Patent is hereby corrected as shown below:

On the Title page # 65 after "Prior Publication Data" please insert the following:

--Foreign Application Priority Data

August 28, 2003 (CN)              03125339.3--

Signed and Sealed this

Twenty-second Day of May, 2007

JON W. DUDAS
*Director of the United States Patent and Trademark Office*